Patented Mar. 5, 1935

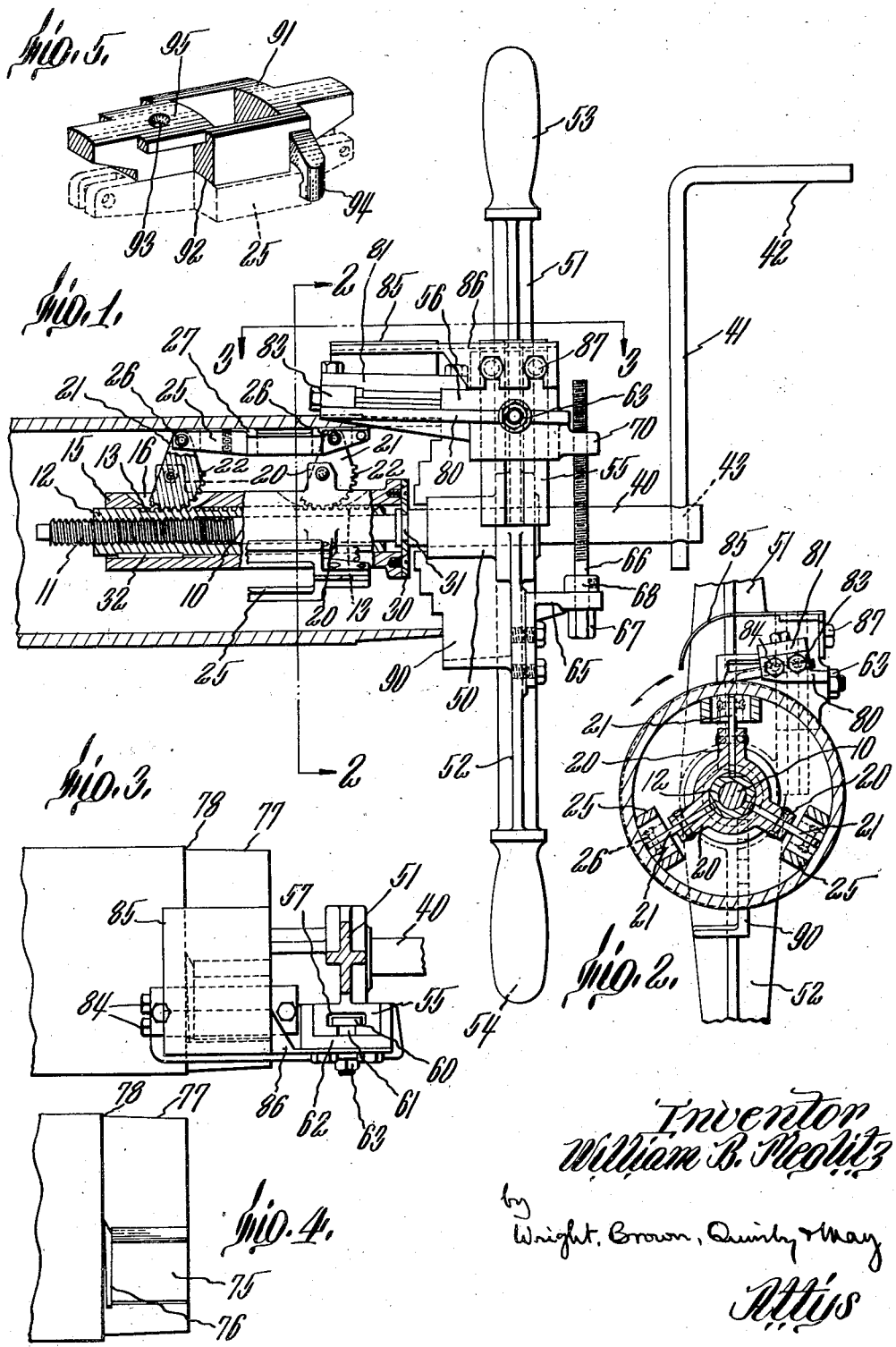

1,993,561

UNITED STATES PATENT OFFICE 1,993,561

PIPE TRIMMING APPARATUS

William B. Meglitz, Berlin, N. H., assignor to Brown Company, Berlin, N. H., a corporation of Maine Application May 26, 1932, Serial No. 613,667

5 Claims. (Cl. 82—4)

This invention relates to mechanism for trimming the end portions of pipes or tubes, together with means for supporting the trimming tool for operation on the pipe or tube. Felted fiber tubing, suitably waterproofed by impregnating with asphalt, pitch, or other water-repellent substance, and by coating the tubes with waterproofing material, have come into wide use for many purposes. These tubes are customarily made in standard lengths, usually eight feet, the ends of each tube section being suitably trimmed or finished so as to receive a complementally trimmed end of another tube section or a coupling element by which each section of tubing may be joined end to end with other similar sections. It frequently happens that in laying a conduit, a bend or elbow will have to be located at such a point as to necessitate the use of a section of conduit shorter than the standard length. It is easy to cut off the desired amount from a section of standard length, but in order to make a suitable joint, the cut end must be accurately trimmed to fit a coupling member. Since such cutting must ordinarily be done where the pipe is being laid, the cut pieces cannot as a rule be conveniently sent to the factory for suitable trimming. It is the object of this invention to provide a simple portable trimming apparatus of light weight which can be conveniently transported to any place where it is needed and can be easily operated to trim the cut end of a tube so as to prepare it to receive and fit a coupling member. It is an object of the invention to provide a device as simple as possible but capable of trimming a pipe end accurately. It is a further object of the invention to provide a trimming apparatus which can be easily operated by unskilled labor.

For a more complete understanding of the invention, reference may be had to the description thereof which follows, and to the drawing, of which,—

Figure 1 is a side elevation of an embodiment of the invention as applied to a tube to be trimmed, portions of the mechanism being broken away to show in section.

Figure 2 is a section on the line 2—2 of Figure 1.

Figure 3 is a section on the line 3—3 of Figure 1.

Figure 4 is a view taken on the line 3—3 of Figure 1, but showing only the cutting blades in their relation to each other and to a tube end, supporting mechanism being omitted.

Figure 5 is a perspective view of an attachment for increasing the effective diameter of the chuck.

The apparatus illustrated on the drawing includes a central shaft 10 having a threaded portion 11 on which is threaded an elongated nut 12. This nut is preferably of cylindrical or tubular form and is provided on its exterior surface with longitudinal racks 13 of gear teeth. In the embodiment illustrated on the drawing, three pairs of such racks are provided, these being uniformly spaced from each other at equal angles around the periphery of the nut 12. It is evident that if desired more or less than three pairs of racks can be provided. The nut 12 is slidably fitted in a sleeve or hollow support member 15. This member is provided with pairs of lateral apertures 16, each pair of apertures being longitudinally aligned so as to expose teeth of one of the racks 13, there being a pair of apertures 16 for each of the racks 13. On either side of each aperture 16 is an ear 20, a supporting lever 21 being pivotally mounted between each pair of ears. Each lever 21 is provided with an arcuate edge portion 22 on which gear teeth are formed, this arcuate edge portion being concentric with the pivot axis of the lever. The gear segment 22 on each lever is arranged to project through a corresponding aperture 16 so as to mesh with a portion of the adjacent rack 13. An elongated gripping element 25 is pivotally connected to each pair of levers 21 as at 26, each gripping element 25 being movable toward and from the axis of the shaft 10 by simultaneous rocking movement of the levers 21 on which it is mounted, this movement being in parallelism with the axis of the shaft. The gripping elements 25 each have outer face portions 27 which are shaped to engage the inner surfaces of tubes to be gripped. On an end of the support member 15, an annular plate 30 is secured, this plate being made in two pieces so as to enter an annular groove 31 in the shaft 10 and thus to prevent axial movement between the support member 15 and the shaft 10. The nut 12 is splined as at 32 to the support member 15 so as to prevent relative rotation between these members but to permit free relative axial movement. The shaft 10 is provided with a smooth extension 40, this portion being provided with means actuable to rotate the shaft. Such means may conveniently consist of a crank handle 41 consisting, as shown, of a piece of bar stock bent to form a handle portion 42, the end of the shank portion being adapted to project through a suitable transverse bore 43 in the projecting end portion of the extension 40. The handle 41 may easily be inserted when it is desired to expand the mandrel within the end portion of a tube. The handle 41 may then be removed to facilitate the mounting of the cutting mechanism.

The cutting mechanism may consist of a hub portion 50 centrally bored to fit slidably on the shaft extension 40. Extending radially from the hub portion 50 in opposite directions are a pair of arms 51 and 52 terminating respectively in handle portions 53 and 54. A bearing plate 55 is mounted on or formed integrally with one of the radial arms. A tool carriage 56 is mounted on the plate 55 and projects laterally therefrom so as to be approximately parallel with the axis of the shaft 10. In order to secure the tool carriage firmly in place on the plate 55, the plate is provided with a longitudinal undercut slot 57, as shown in Figure 3, to receive the head 60 of a bolt 61 which projects through a channel portion 62 of the the tool carriage. This channel portion fits over a portion of the plate 55 so that it rests upon the face of the plate and also engages portions of the side edges thereof. A nut 63 on the bolt 61 is provided to clamp the channel portion 62 of the carriage tightly against the plate 55. By loosening of the nut 63, the carriage may be radially adjusted with reference to the arm 51.

In order to facilitate setting the carriage 56 in correct position for trimming the end of a conduit of a particular size, I may provide slow motion adjustment means such as are illustrated in Figure 1. To this end, a bracket 65 may be secured to the arm 52, this bracket being pierced to receive an elongated bolt 66 having a head 67 which is adapted to bear against one face of the bracket. A collar 68 may be secured to the bolt on the opposite side of the bracket so that the bolt may rotate but is held against axial movement relative to the bracket. An ear 70 may be provided on the carriage 56, this ear projecting outwardly in a direction parallel with the projecting portion of the bracket 65. The ear is bored and threaded to receive the threaded end portion of the bolt 66 so that when the bolt head 67 is turned by a wrench or other suitable tool, the carriage 56 is thereby adjusted slowly along the arm 51. When the carriage has been adjusted to its desired correct position, the nuts 63 may be set up on the bolts 61 to clamp the carriage firmly in its desired operating position.

On the carriage 56 may be mounted suitable cutting tools as desired, according to the shape of cut which is to be made. As shown in Figure 4, these tools may consist of a broad knife 75 and a narrow knife 76 arranged at right angles thereto, the knife 75 being arranged to cut a taper 77 on the end portion of a fiber tube, the knife 76 being arranged to cut a shoulder 78 terminating the taper surface. It is evident that the carriage 56 may be designed to accommodate tools of other shapes and in other positions. In order to cut a taper of correct angle, the carriage 56 may be provided with a projecting portion 80 extending from the portion which bears on the plate 55, this projecting portion 80 being arranged at the angle of taper with respect to the axis of rotation of the mechanism. The tool 75 is thus adapted to be clamped as by a plate 81 against the projection 80 so that the tool will take the angle of the supporting plate 80 and will thus be correctly positioned for a taper cut of the proper pitch, this pitch being ordinarily 2° in the case of fiber conduit. The knife 76 may be clamped securely between a lug 83 formed at the end of the projection 80 and a side edge of the knife 75 as by a pair of set screws 84 threaded through the lug 83. In order to protect the fingers of an operator from the sharp edges of the cutting tools, a suitable guard 85 may be mounted on the carriage 56, this guard being arranged to extend forwardly above and beyond the cutting edges of the knives 75 and 76, being spaced therefrom in order to avoid interference with the cutting action on the work. The guard 85 may be supported by any suitable means such as for example a bracket 86 secured to the carriage 56 as by a pair of bolts 87.

The axial extent of a taper cut on the end portion of a fiber conduit customarily varies with the size of the conduit, a relatively short cut being made on a conduit of small diameter, and a relatively longer taper cut being made on a conduit of relatively large diameter. In order to regulate definitely the axial extent of the taper surface cut on conduit of various sizes, an abutment plate 90 may be provided, this plate projecting in two parts from the arms 51 and 52 toward the work. The plates 90 are symmetrically arranged with respect to the hub 50 and are each provided with a stepped edge so that the portions of the plates nearest to the hub 50 project furthest from the arms 51 and 52. It is apparent that the axial spacing of the knife 76 from the several steps of the plates 90 is a definite amount for each step. Thus when the apparatus is used on a tube of large size, the knife 76 will trim along the periphery of the tube, advancing axially until the end of the tube engages one of the steps of each of plates 90. Further axial progress of the cutters will then be stopped so that the axial extent of the trimmed surface is thus definitely determined for a tube of any size.

It is evident that the gripping members 25 are capable of only limited radial movement toward and from the axis of the shaft 10. Thus the capacity of the apparatus as shown in Figure 1 is limited to tubes having an inner diameter within a restricted range. In order to accommodate conveniently tubes of larger diameter, I may provide auxiliary members 91 such as are illustrated in Figure 5. These members are adapted to fit on the outer surface of respective gripping members 25 so as to engage the inner surface of pipes of inner diameter too great to be reached by the elements 25 themselves. These auxiliary members are provided with a curved under surface 92 adapted to fit on the curved outer surface 27 of the gripping members 25. A countersunk hole 93 is provided for a screw by which the members 91 may be secured to the respective members 25. A pair of outwardly and downwardly projecting arms 94 may also be provided to engage the sides of the member 25 so as to hold the member 91 aligned therewith. The outer surface 95 of the member 91 is cylindrically curved, the radius of curvature being greater than that of the outer surface of the member 25 so as to enable the member 91 to fit within tubes of larger size.

In operating the apparatus, the carriage 56 may be adjusted to operate on a tube of any desired size by loosening the nut 63 and adjusting the position of the carriage by turning the bolt 66. The nut 63 is then tightened to secure the carriage firmly in operating position. This adjustment may be made if desired before the rotating portion of the mechanism, including the arms 51 and 52, is assembled with the remainder of the apparatus. The shaft 10 with the chuck thereon is inserted in the end of a tube to be trimmed and the chuck is set up to grip the inner surface of the tube by rotating the shaft by means of the crank 41. The crank 41 is then removed and the hub 50 is slipped on the shaft 10 to bring the cutting tools into operative position. The handles 53 and 54 are then swung around so as to revolve the tool around the end of the work, the mechanism being pressed axially forward as it is revolved so that the tools advance axially as they cut until the plates 90 engage the end of the tube. The cutting mechanism is then slipped off the shaft 10, whereupon the chuck may be removed and inserted in another pipe to be trimmed.

It is evident that many modifications in form and structure can be made without departing from the spirit or scope of the invention as defined in the following claims.

I claim:

1. A device of the class described, comprising an expansible mandrel, means including a shaft rotatable relatively to said mandrel to expand and contract the mandrel, said shaft having a smooth cylindrical extension, and trimming mechanism rotatably mounted on said smooth extension and axially slidable thereon, said mechanism comprising a hub portion having a bore slidably fitting on said extension, a radial operating arm projecting from said hub portion, a tool carriage radially adjustable on said arm and projecting laterally therefrom, a trimming tool mounted on said carriage, and an abutment member extending laterally from said arm in the same direction as the tool carriage to limit the advance of the cutting mechanism on the work.

2. A device of the class described, comprising means expansible to grip the interior of a pipe, means including a shaft actuable to expand and contract said expansible means, said shaft having a smooth extension, a radial arm loosely mounted on said extension and axially slidable thereon for free rotation about the axis thereof and free axial movement thereon, a tool carriage projecting laterally from said arm, a tool mounted on said carriage, and an abutment member projecting laterally from said arm, said abutment member presenting a series of axially offset faces toward the work, the faces more remote from the work being also more remote from the axis of the shaft.

3. A device of the class described, comprising means expansible to grip the interior of a pipe, means including a shaft actuable to expand and contract said expansible means, said shaft having a smooth extension, and cutting means rotatably mounted on said extension and axially slidable thereon, said cutting means including a hub portion with a smooth bore slidably fitted by said extension, a pair of radial arms extending from said hub in opposite directions and terminating in handle portions, a tool carriage projecting laterally from one of said arms and radially adjustable thereon, a tool mounted on said carriage, a guard plate mounted on said carriage radially outward of said tool, and a pair of abutment members extending laterally from said arms toward the expansible means to limit the advance of the tool on the work.

4. A device of the class described, comprising a plurality of elongated pipe-engaging elements, a hollow support member for said elements, a pair of links connecting each said element with said support member, each said link having an arcuate edge portion formed with gear teeth, a tubular rack axially movable within said tubular member, said support member and rack being relatively non-rotatable, said rack having gear teeth meshed with said connecting links, a shaft projecting through said tubular rack, said shaft having a threaded portion in threaded engagement with said rack, means preventing relative axial movement between said support member and said shaft, and means actuable to rotate said shaft.

5. A device of the class described, comprising a shaft having a threaded portion, an elongated nut threaded on said shaft, said nut having racks of gear teeth formed on its outer surface, a hollow support member axially slidable on said nut and splined thereon, said hollow member having pairs of longitudinally aligned lateral apertures therethrough exposing portions of said racks, a pair of ears projecting radially from said hollow member on either side of each aperture, a connecting link pivotally mounted between each pair of ears, each link having an arcuate edge portion concentric with its pivot and extending through its corresponding aperture to mesh with an exposed rack portion, an elongated grip element pivotally mounted on each pair of aligned links and radially movable thereby in parallelism with said shaft, and means for preventing relative axial movement between said support member and said shaft.

WILLIAM B. MEGLITZ.